United States Patent
Maity et al.

(10) Patent No.: US 8,431,018 B2
(45) Date of Patent: Apr. 30, 2013

(54) CARBON SUPPORTED CATALYST FOR DEMETALLATION OF HEAVY CRUDE OIL AND RESIDUE

(75) Inventors: Samir Kumar Maity, Mexico City (MX); Jorge Ancheyta Juárez, Mexico City (MX); Fernando Alonso Martínez, Mexico City (MX); Hidetsugu Fukuyama, Chiba (JP); Satoshi Terai, Chiba (JP); Masayuki Uchida, Chiba (JP)

(73) Assignees: Instituto Mexicano del Petroleo, Mexico City (MX); Toyo Engineering Corporation, Chiba (JP)

( * ) Notice: Subject to any disclaimer, the term of this patent is extended or adjusted under 35 U.S.C. 154(b) by 565 days.

(21) Appl. No.: 12/716,776

(22) Filed: Mar. 3, 2010

(65) Prior Publication Data

US 2010/0224535 A1 Sep. 9, 2010

(30) Foreign Application Priority Data

Mar. 3, 2009 (MX) .................. MX/a/2009/002359

(51) Int. Cl.
*C10G 45/60* (2006.01)
*B01J 21/18* (2006.01)

(52) U.S. Cl.
USPC ............. 208/216 PP; 208/251 H; 208/251 R; 208/199; 208/307; 502/182; 502/185

(58) Field of Classification Search .................. 502/185, 502/182; 208/299, 307, 251 H, 216 PP, 251 R
See application file for complete search history.

(56) References Cited

U.S. PATENT DOCUMENTS

| | | | |
|---|---|---|---|
| 3,770,617 A | 11/1973 | Riley et al. | |
| 3,864,416 A | 2/1975 | Campbell et al. | |
| 4,016,106 A | 4/1977 | Sawyer et al. | |
| 4,082,695 A | 4/1978 | Rosinski et al. | |
| 4,328,127 A | 5/1982 | Angevine et al. | |
| 4,332,782 A | 6/1982 | Scherzer et al. | |
| 4,422,960 A | 12/1983 | Shiroto et al. | |
| 4,456,701 A | 6/1984 | Chen | |
| 4,508,841 A | 4/1985 | Onuma et al. | |
| 4,520,128 A | 5/1985 | Morales et al. | |
| 4,572,778 A | 2/1986 | Ward | |
| 4,613,427 A | 9/1986 | Sepulveda et al. | |
| 4,870,044 A | 9/1989 | Kukes et al. | |
| 5,037,791 A * | 8/1991 | Comolli et al. ............... | 502/185 |
| 5,210,061 A | 5/1993 | Simpson et al. | |
| 5,466,363 A * | 11/1995 | Audeh et al. ............. | 208/251 H |
| 5,472,595 A | 12/1995 | Sudhakar et al. | |

(Continued)

*Primary Examiner* — Nina Bhat
(74) *Attorney, Agent, or Firm* — Roylance, Abrams, Berdo & Goodman, L.L.P.

(57) ABSTRACT

A supported carbon having high surface area, high pore volume containing (i) molybdenum (ii) a metal of non noble Group VIII, (iii) phosphorous, is used for hydrometallization of heavy crude oil and residue. The catalyst contains about 6 to 15 wt % molybdenum as $MoO_3$, about 1 to 6 wt % cobalt or nickel as CoO or NiO and phosphorus as phosphorous oxide. One characteristic of the catalyst is the portion of pores having pore diameter in the range of 200 to 2000 Angstrom of 20 percent or more. The catalyst prepared by chelating agent has higher hydrodesulfurization activity assuming that more dispersed active metals are present on this catalyst. Long run activity studies show that catalyst having only molybdenum supported on activated carbon has good stability with time-on-stream and very high metal retention capacity.

12 Claims, 5 Drawing Sheets

U.S. PATENT DOCUMENTS

| | | |
|---|---|---|
| 5,531,976 A | 7/1996 | Decker, Jr. et al. |
| 5,837,640 A * | 11/1998 | Sudhakar et al. ............. 502/185 |
| 6,162,351 A | 12/2000 | Sudhakar et al. |
| 6,218,333 B1 * | 4/2001 | Gabrielov et al. ............ 502/216 |
| 7,563,311 B2 * | 7/2009 | Graham .......................... 96/153 |

* cited by examiner

CARBON SUPPORTED CATALYST FOR DEMETALLATION OF HEAVY CRUDE OIL AND RESIDUE

CROSS-REFERENCE TO RELATED APPLICATION

This application claims the benefit under 35 U.S.C. §119 of Mexican Patent Application No. PA/a/2009/002359, filed Mar. 3, 2009, which is hereby incorporated by reference in its entirety.

TECHNICAL FIELD OF INVENTION

The present invention relates to a catalyst supported on carbon, having high pore volume, containing the active elements of group VIB, a non-noble metal of the Group VIII and an additive of Group VA for hydrodemetallization (HDM) and hydrodesulfurization (HDS) of heavy crude oil and residues by hydrotreatment (HDT).

BACKGROUND OF THE INVENTION

The increasing demand of lighter products and middle distillates will continue in the near future and at same time the demand of heavy crudes is decreasing. To meet this demand a substantial quantity of heavy crudes has to be upgraded. Since the heavier crudes contain various types of contaminants the refining processes are modified technologically. The technological change can not only handle with very tighter environmental legislation. Therefore, several efforts are made for making new generation of catalysts which are more active, more selective, more life time and more thermally stable.

The presence of high percentage of asphaltene is the main concern during hydroprocessing since these compounds are the primary cause of catalysts deactivation. It is the main precursor of coke. It is the main precursor for formation of coke. Deactivation of hydroprocessing catalysts is found on time-on-stream. Activity changes rapidly during the first few hours of run and then it becomes stable. Coke equivalent to up to 25 wt % of the original catalyst is deposited within few hours of run and this can decrease surface area up to 50 to 60% of the original catalyst. Loss of surface area is occurred due to blockage of small pore of the catalyst.

The presence of vanadium and nickel is of particular importance because of their poisoning effect during hydrodesulfurization and cracking of the feeds. The metals are usually distributed between porphyrin and nonpophyrin type of structures. These metal containing compounds are deposited into the catalyst during hydrotreating. Because of their large size they do not penetrate deeply into the catalyst. They are accumulated as metal sulfides into the pore mouth of the catalyst and block the way to enter the reactants. This is cause for deactivation of catalyst. Therefore, the main features of a HDM catalyst are very large pore diameter and large pore volume. It has to be very high metal storage capacity.

To develop new type of hydroprocessing catalysts various kind of approaches are have been reported such as the use of different supports materials, different active metals, modified support and catalyst by using several additives, etc.

The use of carbon support for hydrotreating catalyst is also investigated. It was also found that sometimes, carbon supported catalyst shows higher HDS activity compared with catalysts supported by conventional carrier like $Al_2O_3$ and $SiO_2$. The use of carbon support has several advantages. It has very high surface area, so higher metals impregnation can be done. It is easy to control pore structure so that diffusional limitation can be minimized. The recovery of the active metals or deposited metals during reaction is easy; just it can be done by burning off carbon carrier. This carbon support is particularly attractive for hydrotreating of heavy crude oils or residue because it reduces coke deposition tendency, which as it has been discussed earlier, is the main concern for HDT of heavy crude oil and residue. It causes rapid deactivation of the catalyst. One of the major disadvantages of the use of this carbon support is its mechanical resistance. However, mechanical strength can be improved by using different kind of binding materials.

The raw carbon material is in general inert and this material can not be used as such for carrier to prepare HDT catalyst. There are several methods to improve its basic and acid characteristics such as steam treatment, $HNO_3$, $Na_2CO_3$, NaOH, HCl oxidation. It was reported that raw C has very small basic sites and 10 times higher content of very week acid sites. When this raw C is treated with steam the basic sites are generated in expense of week acid sites. However, when it is activated with nitric acid or $(NH_4)_2S_2O_8$, it develops acidic sites at the cost of basic sites. During oxidation of C with $(NH_4)_2S_2O_8$ it produces carboxylic groups on the carrier surface which are highly acidic in strength.

The support-metal interaction of carbon carrier is comparatively week. Therefore, sulfidation of carbon supported catalyst is more effective and hence one can expect more active sites on this type of catalyst. Due to its week interaction the formation of CoMoS type II structure is more favorable on this catalyst. In general, CoMoS type I is formed on the alumina supported catalyst at lower sulfidation temperature. When temperature raises the formation of type II CoMoS structure is predominant which is comparatively high active sites than type I. Mössbauer emission and X-ray absorption spectroscopy studies on sulfided catalyst have shown that the presence of CoMoS may be abundant on such a catalyst. Other studies also showed that the formation of more active octahedral species is easy on carbon supported catalysts. The thiophene HDS activity of carbon supported catalyst is very high and also depends on the acid characteristics of the surface. It is found that raw carbon treated with $(NH_4)_2S_2O_8$ is more acidic than that of treated with $HNO_3$. It is manly due to the formation of carboxylic group on the carbon carrier when it is treated with $(NH_4)_2S_2O_8$. These acidic sites enhance the thiophene HDS activity. However, weak interaction of active metal and carbon has high probability of the formation of bulk metal sulfide during activation of the catalyst and it causes decrease of HDS activity. It is also proposed that the active metals and sulfur compound of the reactant is strong on the carbon supported catalyst resulting higher activity.

There are several approaches to development suitable hydrotreating catalysts for heavy crude oils and residue. One of them is the improvement of pore structure of the carrier materials used to prepare the catalyst. An enlarging of pore diameters and higher pore volume are the most suitable options to minimize diffusional restriction and improve metals retention capacity of the catalyst. Various methods were employed for the preparation of catalysts for hydrotreating of heavy feedstocks and for the processes for the same in the following U.S. Pat. Nos. 3,770,617; 3,864,416; 4,016,106, 4,082,695; 4,328,127; 4,332,782; 4,422,960; 4,456,701; 4,508,841; 4,520,128; 4,572,778; 4,613,427; 4,870,044; 5,210,061; 5,531,976; 5,928,499; 6,015,485.

U.S. Pat. No. 5,472,595 is directed to the use of carbon support for hydrodesulfurization and hydrodearomatization of a light atmospheric gas oil. The catalyst supported on carbon having 600 $m^2$/g specific surface area, about 0.3 cc/g total pore volume, at least 12 Å average pore diameter is loaded by about 35.9 wt % W, 7.0 wt % Ni and 1.1 wt % P. The sulfided catalyst is tested with light gas oil in presence of hydrogen at 340° C. temperature, 53 kg/cm$^2$ pressure, 2.0 h$^{-1}$ LHSV and 356 m$^3$/m$^3$ hydrogen flow rate.

U.S. Pat. No. 5,837,640 disclosed the use of carbon support for preparation of hydrodearomatization and hydrodesulfurization catalysts. The catalyst having BET specific surface area of 900 m$^2$/g, pore volume of 0.8 cc/g, pore diameter of 20 Å is loaded by about 18.6 wt % of MoO$_3$, 3.8 wt % of NiO. Ammonium heptamolybdate and nickel nitrate are used for metal and promoter loading respectively. The catalyst is tested with middle distillate in presence of hydrogen at temperature of 380° C., pressure of 100 kg/cm$^2$, LHSV of 1 h$^{-1}$ and hydrogen flow of 713 m$^3$/m$^3$.

U.S. Pat. No. 6,162,351 discloses the use of carbon support to prepare hydrodenitrogenation catalyst. The catalyst is employed for removal of aromatic and nitrogen compounds from middle distillate. The catalyst has high specific surface area carbon support of 1600 m$^2$/g, nitrogen pore volume of 0.82 cc/g and an average pore diameter of 20 Å. The catalyst contains about 12 wt % of molybdenum, 5 wt % of cobalt and 3 wt % of chromium.

These prior art works reveal a continuous change of hydrotreating processes and an improvement of catalytic activity. However, the major problem in the present scenario is the increasing production of heavy crude oils and decreasing of the demand of bottom products. It needs the upgradation of heavy crude oils and residue.

All references discussed above provide catalysts which are usually deactivated rapidly; this invention provides a catalyst supported on activated carbon, which maintains a high stability for the hydroprocessing of heavy crude oil and residues.

SUMMARY OF THE INVENTION

A hydroprocessing catalyst has been found for the hydrotreatment of hydrocarbons, particularly heavy crudes and residues that contain a high percentage of metals and sulfur.

The catalyst of the present invention comprises an activated carbon extrudate support having a wide pore structure and a total pore volume of 0.7 to 1.8 cc/g, the portion of pores having pore diameter in the range of 200 to 2000 Angstrom is 20 percent or more, and the ratio by volume of pores having pore diameter in the range of 380 to 900 Angstrom to pores having pore diameter in the range of 200 to 2000 Angstrom is 40 percent or more.

According to one embodiment of this invention, inert carbon particles, which can be used as catalyst support material, contain at least one element selected from the group consisting of Ti, Zr, Cr, Mn, Mo, W, Ni, Co, Zn, and P preferably oxide and/or sulfide of Mo, W, or Co and or Ni to form the catalyst. In addition to the hydrogenation promoters, one or more compounds of phosphorus may also be present in the said embodiment.

According to still another embodiment of the invention, the present catalyst is used for hydrodemetallization and hydrodesulfurization of heavy crudes and residues.

DETAILED DESCRIPTION OF THE INVENTION

Figure 1:
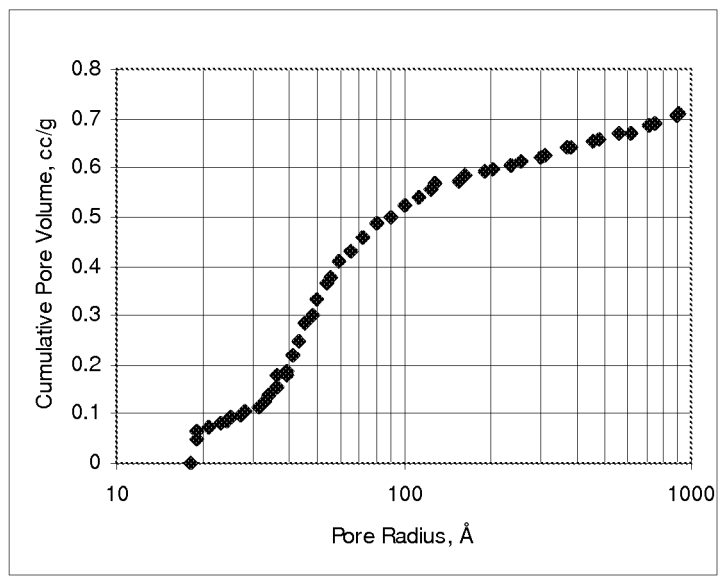
FIG. 1 is a pore distribution of carbon support used for this invention.

In the present invention, carbon was used as a support having high surface area-specific high, large pore volume and which contains (i) a transitional metal Group VIB, (ii) a metal as promoter of Group VIII, (iii) an additive Group VA, such as phosphorus, for hydrodemetallization of heavy crudes and residues. The catalyst contains 1 to 25% by weight, preferably from 6 to 15% by weight of molybdenum as MoO$_3$, 0.5 and 10% by weight, preferably from 1 to 6% of cobalt or nickel, as CoO or NiO and a non-metal of the Group VA, such as phosphorus in the form of phosphorous oxide, 0.1 and 10% by weight, preferably 0.1-4%. Some of the materials of this invention also contain Fe$_2$O$_3$ between 1-5% in weight and a chelating agent (chelating agent/nickel~1.2).

A feature of the catalyst is the proportion of pores of 20% or more that have a pore diameter in the range of 200 to 2000 angstroms. The catalyst prepared by using a chelating agent and has an activity to the highest hydrodesulfurization, assuming that the active metals are more dispersed metals on this catalyst. A long run study showed that the catalyst that has only supported on activated carbon molybdenum has good stability time-on-stream and a holding high metal retention capacity.

In the same way, the present invention relates to the removal of metals and sulfur from heavy crude oils and residues. Specifically, this invention relates to the preparation of catalysts for the hydrodemetallization (HDM) and hydrodesulfurization (HDS) of heavy crudes and residues. More specifically, the main objective of this invention is the upgrading of heavy crudes and residues by catalytic hydrotreatment (HDT) using catalysts supported on carbon. Carbon support extrudate is produced by a general method. The raw material of carbon support includes charcoal, coconut shell carbon, peat, lignite, brown coal, bituminous coal, petroleum cokes, etc. The raw material of carbon support is roughly ground into course particles of 8 to 32 mesh size and then devolatilized at 200 to 300° C., and the devolatilized product is then finely ground until the content of fine particles of not greater than 280 mesh size reaches 75 to 85 percent by weight or more. About 0.5 part of a binder such as tar, pitch and starch is mixed with 1 part of the devolatilized product, then water is added in a water content of 10 to 20 percent by weight, and the mixture is kneaded uniformly. The material is molded by extruding it at a pressure of 3059 to 6108 kg/cm$^2$ through a die arranged in an extrusion molding machine. The opening diameter of the die is selected depending on the use of carbon support, and in this example, a die having a diameter of 1 mm and 2 mm were used.

To activate the carbon support extrudate, a method of using a rotary kiln is generally known. The activating gas used may be steam, carbon dioxide, air or a mixed fluid thereof, but carbon dioxide is poor in reactivity, thus requiring a longer time for activation, and is effective in development of only micropores of 20 Angstroms or less.

In the present invention, steam which is highly reactive and can achieve the distribution of pores having the most suitable size, is more preferable. First, the extruded product is dried at about 140° C. in air or a combustion gas and then carbonized at 400 to 600° C., and then the resulting carbonized material is fed to a rotary kiln and activated with steam at a temperature of 800 to 950° C. In these steps, the extruded product becomes activated carbon having a diameter of 1 mm or 2 mm and length of 3 to 8 mm. The optimum activation time is selected depending on the easiness of activation of the starting carbon source, the intended pore volume, specific surface area, pore distribution, etc. That is, when the activation time is short, pores are undeveloped. When the activation time is increased, the crushing strength of the resulting activated carbon extrudate is lowered to cause a problem that the activated carbon cannot endure industrial use or the yield is decreased to bring about economic disadvantage. The standard activation time used in the present invention is preferably 4 to 12 hours, more preferably 6 to 9 hours to produce the active carbon having a total pore volume 0.7 to 1.8 cc/g, the portion of pores having pore diameter in the range of 200 to 2000 Angstrom is 20 percent or more, and the ratio by volume of pores having pore diameter in the range of 380 to 900 Angstrom to pores having pore diameter in the range of 200 to 2000 Angstrom is 40 percent or more. The pore size distribution of the activated carbon was measured by mercury porosimeter. Pore size distribution of carbon support is presented in FIG. 1.

The carriers are in extruded form, in pellets or in spheres, but preferably extruded in size 1-2 mm and length of 3 to 8 mm, said carriers having a total pore volume 0.7 to 1.8 cc/g, the portion of pores having pore diameter in the range of 200 to 2000 Angstrom is 20 percent or more, and the ratio by volume of pores having pore diameter in the range of 380 to 900 Angstrom to pores having pore diameter in the range of 200 to 2000 Angstrom is 40 percent or more.

In this present invention the catalyst was prepared by co-impregnation method. In this method the oxide or binary oxides is placed in contact with an aqueous solution which contains all active metal or metal of Group VIB, the Group VIII and/or phosphorus oxide, preferably as phosphoric acid. Then the said impregnated sample is passed to the drying and calcination stage so as to obtain the final catalyst in an oxidized form.

The active carbon support is placed for 24 hours in contact with an aqueous solution containing ammonium heptamolybdate, ammonium paramolybdate, ammonium oxalate or a soluble salt corresponding to any other metal of Group VIB containing 1 to 25 wt % of the oxide of molybdenum, preferably 5 to 15 wt % of the metal oxide on the catalyst weight basis. The aqueous solution also contains cobalt nitrate so as to obtain a composition of between 0.5 to 10 wt % by cobalt oxide, preferably 1 to 5 wt % on the dry weight of the catalyst. The particular solution also contains phosphoric acid or ammonium acid phosphate or other phosphate compounds so as to obtain a composition between 0.1 to 10 wt %, preferably 0.1 to 4 wt % of phosphorus oxide. Some of the catalysts have also 1 to 5 wt % ferric oxide and chelating agent.

This particularly embodiment comprises at least one hydrogenation promoter selected from the group consisting of transition metals of Groups IIIB, IVB, VB, VIB, VIIB, VIII, IB, IIB of the periodic table and preferably La, Ce, Fe, Ti, Cr, Mo, W, Mn, Ni, Co. The most preferred hydrogenation compounds are oxides and/or sulfided of Mo, Co, Ni and mixtures of two or more of these compounds. In addition to these hydrogenation promoters, one or more compounds of phosphorus may also present in the said embodiment.

After impregnation of the metals and promoters into the carrier the impregnated samples are allowed to dry at certain hours at room temperature. Then these samples are dried at 200° C., preferably at 120-180° C. for 7 hours and these are placed to calcinations at 300-600° C. for a period of 5 hours at nitrogen atmosphere. In this process metals and promoters salts are converted as respective oxide form.

Carbonaceous species have also been introduced with active metals to get more active, selective and more stable hydrodemetallization and hydrodesulfurization catalyst.

In this regard, the use of chelating agent is well known to prepare hydrotreating catalysts for enhancing dispersion of active metals. In this particular case the preferred chelating agent is ethylenediaminetetraacetic acid (EDTA) and derivatives of this agent including diammonium ethylenediaminetetraacetic acid, hydroxyl ethylenediaminetetraacetic acid. Some other know chelating agents used to prepare dispersed-active-metal-catalyst are diethyletriaminepentaacetic acid, ethyleneglycol-bis-N,N'-tetraacetic acid, cyclohexanediaminetetraacetic acid, tetraethylenepentaamine.

The hydrotreating process in this invention is carried out in a fixed bed reactor employing suitable operating conditions using heavy hydrocarbon feedstock which contains high metals, high sulfur contents. Suitable hydrotreating conditions include temperature of 100° C. to 500° C., preferably 200 to 500° C., more preferably 350 to 450° C. A suitable pressure can be utilized in the hydrotreating process and this could be from atmospheric pressure to 350 kg/cm$^2$, preferably 35 to 280 kg/cm$^2$, more preferably from 40 to 210 kg/cm$^2$. The liquid hourly space velocity (LHSV) is in the range of 0.05 to 15 per hour, preferably 0.1 to 10 per hour, more preferably 0.1 to 2 per hour. The hydrogen gas, which is used during hydrotreating process, is circulated at a rate of 90-2000 m$^3$/m$^3$, preferably 180 to 1200 m$^3$/m$^3$.

There are several advantages to the presence of carbon species in the hydrotreating catalysts. Carbonaceous deposits isolate the active sulfide sites and stabilize from sintering. These carbon species are intercalated between the carrier and the sulfide active phase and hence reduce interaction of active sites with support resulting in increase of hydrotreating activities. Another reason to use carbon species is the chemical effect, more active carbide like structure, CoMoC may be formed.

The oxide catalyst was sulfided in-situ before actual run was started. The sulfidation is carried out under controlled conditions to obtain the active metals and promoters in the form of sulfide which are more active than oxide form of such metals and promoters. The preferred sulfiding conditions are: pressure in between 20-35 kg/cm$^2$, temperature in between 260 to 320° C., space velocity (LHSV) is between 1 to 6 per hour. The sulfiding agent consists of 1.7 wt % of sulfur in light gas oil. It may also contain other sulfur compounds like carbon di-sulfide, methyl sulfide, dimethyl disulfide so as to obtain 0.5 to 4 wt %, preferably 1 to 2 wt % in light gas oil.

The catalyst is placed in a fixed bed reactor with equal volume of diluent, carborandum. The catalyst is dried two hours at atmospheric pressure at 120° C. and then allowed for soaking for two hours at 150° C. with light gas oil. After that the light gas oil is injected with sulfiding agent for actual sulfidation. The time for sulfidation may vary from 3 to 10 hours.

Higher temperature can be employed to achieve higher conversions of HDM and HDS, but it has adverse effects on catalyst. Catalyst is deactivated very fast at higher temperature by coking of the heavy feedstocks. Therefore, an optimized temperature is preferable for hydrotreating of heavy feedstocks.

A suitable pressure can be utilized in the hydrotreating process and this could be from atmospheric pressure to 350 kg/cm$^2$, preferably 35 to 280 kg/cm$^2$, more preferably from 40-210 kg/cm$^2$. Higher pressure has a beneficial effect on the hydrotreating reaction such as it can reduce the coke formation and increase conversions. But safety and cost of the operation will be high. The liquid hourly space velocity (LHSV) is in the range of 0.05 to 15 per hour, preferably 0.1 to 10 per hour, more preferably 0.1 to 2 per hour. The hydrogen gas, which is used during hydrotreating process, is circulated at a rate of 90-2000 m$^3$/m$^3$, preferably 180 to 1200 m$^3$/m$^3$. The purity of the hydrogen gas is in the range of 80 to 100 percent.

EXAMPLE 1

This particularly embodiment comprises at least of one hydrogenation promoter selected from the group consisting of transition metals of Groups IIIB, IVB, VB, VIB, VIIB, VIII, IB, IIB of the periodic table and preferably compounds of these metals La, Ce, Fe, Ti, Cr, Mo, W, Mn, Ni, Co. The most preferred hydrogenation compounds are oxides and/or sulfided of Mo, Co, Ni and mixtures of two or more of these compounds. In addition to these hydrogenation promoters, one or more compounds of phosphorus may also be present in the said embodiment. In this present invention the catalyst was prepared by co-impregnation method. In this method, the support material is placed in contact with an aqueous solution which contains all active metal or metal of Group VIB, Group VIII and/or phosphorus oxide, preferably as phosphoric acid. Then the said impregnated sample is passed to the drying and calcination stage so as to obtain the final catalyst in an oxidized form. In this case the catalyst contains about 8 to 15 wt % of MoO$_3$, 1-5 wt % of NiO and 0.5 to 1.5 wt % of P on the catalyst weight basis.

In this invention, heavy oil is used as feedstock which has high metals, sulfur, nitrogen and asphaltenes contents. In this case a mixture of a heavy crude oil with hydrotreated diesel (50/50 wt %) was used as feedstock and the properties of this mixture are given in Table 1.

TABLE 1

| Properties of the feed used for micro-reactor experiments | |
|---|---|
| Property | Value |
| Density (20/4° C.) | 0.88 |
| API gravity | 37 |
| Sulfur, wt % | 2.21 |
| Nitrogen, wt % | 0.184 |
| Ni, wppm | 26.2 |
| V, wppm | 124.8 |
| nC$_7$ insolubles, wt % | 8.4 |

Ten millimeter of oxide catalyst is sulfided in-situ before actual run was started. The sulfidation is carried out under controlled conditions to obtain the active metals and promoters in the form of sulfide which are more active than oxide form of such metals and promoters. The preferred sulfiding conditions are: pressure in between 20-35 kg/cm$^2$, temperature in between 260 to 320° C., space velocity (LHSV) in between 1 to 6 per hour. The sulfiding agent consists of 1.7 wt % of sulfur in light gas oil. It may also contain other sulfur compounds like carbon di-sulfide, methyl sulfide, dimethyl disulfide so as to obtain 0.5 to 4 wt %, preferably 1 to 2 wt % in light gas oil.

A fixed bed micro-reactor is used in this invention to primarily determine activities for hydrodemetallation and hydrodesulfurization of a particular feedstock. The hydrotreating conditions are as follows: reaction temperature of about 320 to 400° C.; total pressure of 40 to 60 kg/cm$^2$; liquid hourly space velocity (LHSV) of about 1; hydrogen to hydrocarbon ratio of about 890 m$^3$/m$^3$. The activities of this particular catalyst (TS-1) are given in Table 2. These values are reported as conversion of metals (Ni+V) and sulfur which are calculated with the following equation:

$$\text{Conversion} = \left( \frac{\text{metals or sulfur in the feed} - \text{metals or sulfur in the product}}{\text{metals or sulfur in the feed}} \right) x \cdot 100$$

EXAMPLE 2

The catalyst of this particular example is prepared by similar procedure as described in example 1. This embodiment comprises at least one hydrogenation promoter selected from the group consisting of transition metals of Groups VIB and VIII of the periodic table and preferably compounds of these metals Mo, Fe, Ni, Co. The most preferred hydrogenation compounds are oxides and/or sulfided of Mo, Fe, Ni and mixtures of two or more of these compounds. The particular sample contains 8-16 wt % of MoO$_3$, 2-6 wt % of NiO and 1-5 wt % of Fe$_2$O$_3$ on the catalyst weight basis. The catalytic activity of this particular case is carried out as similar procedure as described in example 1. The catalyst is also sulfided before actual activity is studied. The activities of this particular catalyst (TS-2) are given in Table 2.

EXAMPLES 3-4

In this present case the catalysts are prepared by co-impregnation method. In this method the support material is placed in contact with an aqueous solution which contains all active metal or metal of Group VIB, Group VIII and/or phosphorus oxide, preferably as phosphoric acid. Then the said impregnated samples are passed to the drying and calcination stage so as to obtain the final catalyst in an oxidized form. The catalysts contain about 8 to 15 wt % of MoO$_3$, 1-5 wt % of CoO and 0.5 to 1.5 wt % of P on the catalyst weight basis. The catalyst activity is studied with the same feedstock and reaction conditions as stated in example 1. The activities of these two catalysts (TS-3 and TS-4) are presented in Table 2.

EXAMPLE 5

The catalyst of this particular case is prepared by similar procedure as example 2. The catalyst of this case contains higher amount of active metal and promoter. The activities of this catalyst (TS-5) are carried at the same conditions as in example 1, HDM and HDS conversions are given in Table 2.

EXAMPLE 6

In this present case the catalyst is prepared by wetness method. In this method the support material is placed in contact with an aqueous solution which contains active metal or metals of Group VIB, Group VIII and/or phosphorus oxide. Then the said impregnated samples are passed to the drying and calcination stage so as to obtain the final catalyst in an oxidized form. The catalysts contain about 4 to 16 wt % of MoO$_3$. The catalyst activity is studied with the same feedstock and reaction conditions as stated in example 1. The activities of this catalyst (TS-6) are presented in Table 2.

EXAMPLE 7

This embodiment is prepared by similar procedure as stated in example 5. This present catalyst contains higher amount of active metal. The catalytic activity of this particular case is carried out as using the same procedure as describe in example 1. The catalyst is also sulfided before the actual activity is studied. The activities of this particular catalyst (TS-7) are given in Table 2.

EXAMPLE 8

This embodiment is prepared by chelating agent which includes 1,2-cyclohexanediamine-N,N,N',N'-tetraacetic acid (CyDTA), ethylenediaminetetraacetic acid (EDTA), diammonium ethylenediaminetetraacetic acid, hydroxyl ethylenediaminetetraacetic acid, diethyletriaminepentaacetic acid, ethyleneglycol-bis-N,N'-tetraacetic acid, cyclohexanediaminetetraacetic acid, tetraethylenepetaamine. The most preferred chelating agent to prepare the catalyst in this particular case is 1,2-cyclohexanediamine-N,N,N',N'-tetraacetic acid. 2.433 grams of chelating agent is dissolved into the ammonium hydroxide solution. 1.7032 grams of nickel nitrate is dissolved into the distilled water and ammonium solution is added into the Ni solution. The $Ni(NO_3)_2$ solution is added into the CyDTA solution and made a clear solution. A solution of ammonium heptamolybdate is added to the prepared solution which contains nickel and CyDTA. For the impregnation of metals into the support the mixture is added to the dry carrier which is activated carbon. The impregnated sample is dried and calcined with the same procedure described in example 1. The catalyst contains about 5-15 wt % of $MoO_3$, the most preferably content is around 15 wt % $MoO_3$, and also contains about 1-10 wt % NiO, the most preferred content is about 5 wt % NiO. The catalyst activity is studied with the same feedstock and reaction conditions as stated in example 1. The activities of this catalyst (TS-8) are presented in Table 2.

TABLE 2

HDM and HDS activities of catalysts of examples 1-8

| Catalyst | HDM | HDS |
|---|---|---|
| TS-1 | 23.38 | 17.45 |
| TS-2 | 28.61 | 16.70 |
| TS-3 | 28.62 | 21.50 |
| TS-4 | 26.81 | 15.57 |
| TS-5 | 34.73 | 22.69 |
| TS-6 | 33.39 | 9.80 |
| TS-7 | 28.48 | 13.37 |
| TS-8 | 27.75 | 36.58 |

The following observations can be made from the results presented in examples 1-8 and Table 2:
a) The catalyst containing only active metal supported on the carbon shows higher HDM activity.
b) The catalyst prepared by using chelating agent shows higher HDS activity, but its HDM conversion is moderate.

EXAMPLE 9

From the above observations, in this case, the catalyst is tested for its stability on the metals retention capacity which is mentioned in example 6 (TS-6). The particular interest of this investigation is to remove metal contaminants from the heavy or extra heavy crude oils and residue. However, the major problem to treat heavy crude oils and residue is the rapid deactivation of the catalyst. In general, the refiners allow the catalyst at a certain level and then temperature of the reactor is increased to maintain conversion to the required level. During hydrotreating of heavy crude oils and residue, coke and metals are deposited on the catalysts' surface and hence the catalysts are deactivated. Therefore, catalyst stability is very important for hydrotreating of heavy crude oils and residue. In this particular case, the catalyst, which contains at least one hydrogenation promoter selected from the transition metals of Groups IIIB, IVB, VB, VIB, VIIB, VIII, IB, IIB of the periodic table and preferably compounds of these metals La, Ce, Fe, Ti, Cr, Mo, W, Mn, Ni, Co, is investigated for long run stability by using residue as feedstock. The most preferred hydrogenation compounds of this embodiment are oxides and/or sulfided of Mo, Co, Ni and mixtures of two or more of these compounds. In addition to these hydrogenation promoters, one or more compounds of phosphorus may also be present in the said embodiment. In this present invention the catalyst was prepared by co-impregnation method. In this method the support material is placed in contact with an aqueous solution which contains active metal or metals of Group VIB, Group VIII and/or phosphorus oxide. Then the said impregnated samples are passed to the drying and calcination stage so as to obtain the final catalyst in an oxidized form. The catalyst contains about 8 wt % of $MoO_3$.

In this particular case, hundred milliliter of the oxide catalyst is loaded into a pilot plant reactor. This catalyst is divided into five different regions. One region of the catalyst is separated by helly pack. Around 15 cm of the helly pack is used at the top of the reactor to have better distribution of liquid with hydrogen. The reactor is divided by three reactor zones to control heating system. The oxide catalyst is sulfided in situ by using sulfiding agents which include hydrogen sulfide, carbon disulfide, dimethyl sulfide, dimethyl disulfide. The most preferred sulfiding agent is dimethyl disulfide. Upon sulfiding in the presence of hydrogen, active metals and promoter are converted to the sulfide states having metals in 4-valent or below, leaving an unsaturated coordinated site. This unsaturated coordinated site is the site for hydrotreating reactions. In this case the sulfidation is carried out at different temperature so that it is confirmed that the catalyst is completely sulfided. The preferred sulfiding conditions are: pressure in between 10-30 kg/cm$^2$, temperature in between 230 to 360° C., space velocity (LHSV) in between 1 to 6 per hour. The sulfiding agent consists of 1.7 wt % of sulfur in light gas oil. The sulfidation is carried out at two different temperatures. At lower temperature about 260° C., sulfidation is done around 2-5 hours and finally it is carried out at about 320° C. for 5-15 hours.

After sulfidation, the hydrocarbon is passed through the catalyst bed together with fresh hydrogen at appropriate hydrotreating conditions. The feed is admitted to the catalyst bed at about 200-460° C., preferably at 320-420° C., for example about 400° C., and pressure about 50-200 kg/cm$^2$, preferably 80 to 120 kg/cm$^2$, for example about 100 kg/cm$^2$. Liquid hourly space velocity (LHSV) is around 0.2-2 per hour, preferably 0.3-1.5 per hour and most preferably 0.5-1 per hour. Hydrogen is admitted at a flow rate of 180-1200 m$^3$/m$^3$, preferably 890 m$^3$/m$^3$. The hydrocarbon feed which is treated by the process of this case, is a residue and the properties are given in Table 3.

TABLE 3

Properties of feed used for pilot plant experiments

| Property | Value |
|---|---|
| Specific gravity (20/4° C.) | 1.0445 |
| API gravity | 3.6 |
| Sulfur, wt % | 6.23 |

TABLE 3-continued

Properties of feed used for pilot plant experiments

| Property | Value |
| --- | --- |
| Ni, wppm | 110.7 |
| V wppm | 592.8 |
| nC₇ insolubles, wt % | 21.83 |
| ASTM D1160 Distillation, ° C. | |
| IBP/5 vol % | 380/415 |
| 10/15 vol % | 447/474 |
| 20/25 vol % | 504/531 |

Figure 2:
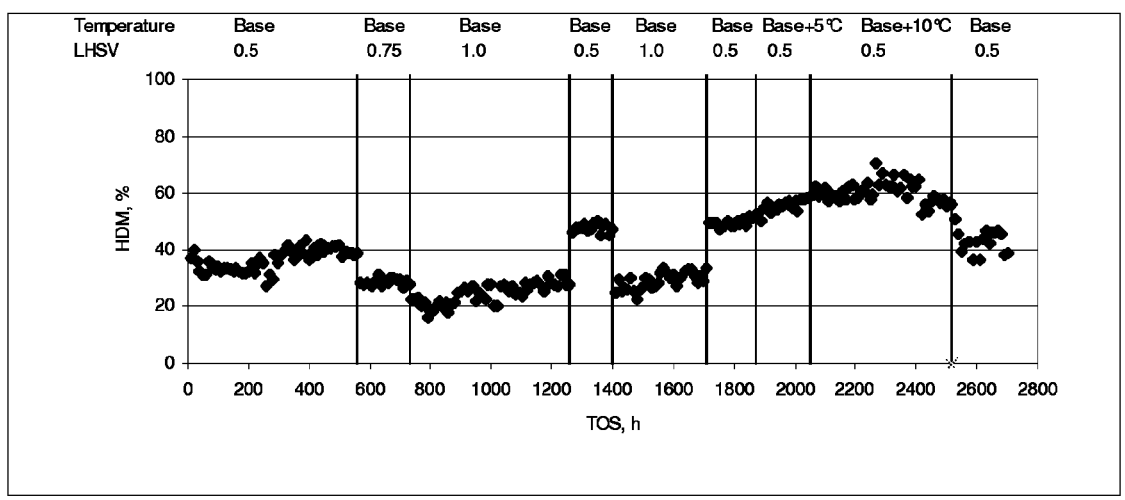
FIG. 2 is a curve showing the hydrodemetallization activity at different reaction conditions.
Figure 3:
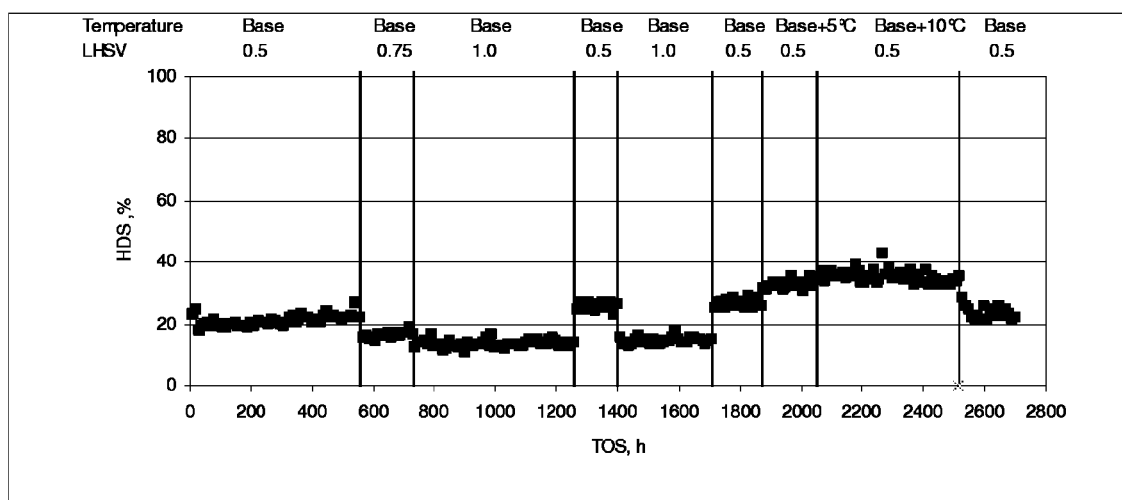
FIG. 3 is a curve showing the hydrodesulfurization activity at different reaction conditions.
Figure 4:
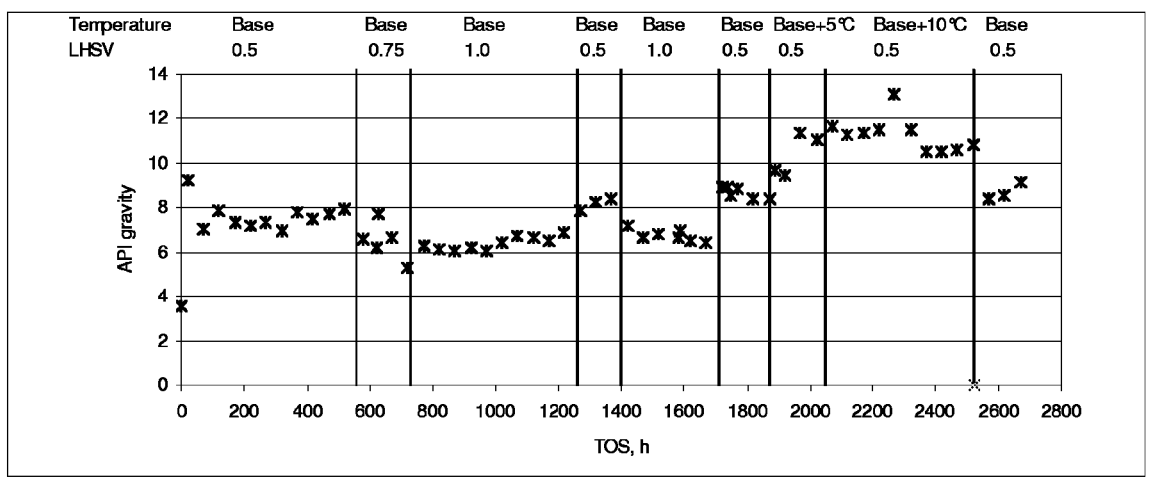
FIG. 4 is a curve showing the improvement of API gravity at different reaction conditions.
Figure 5:
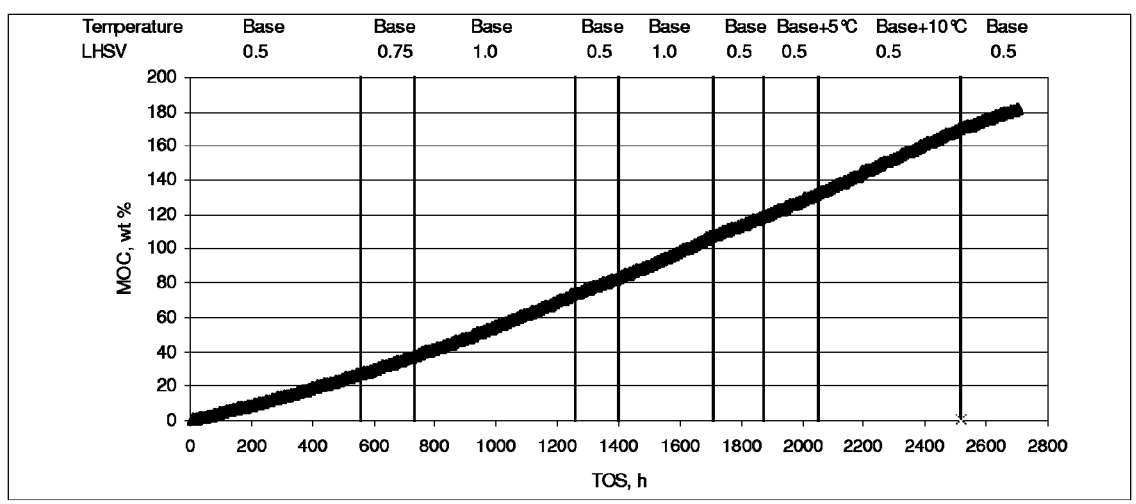
FIG. 5 is a curve showing the metals-on-catalyst (MOC) with respect to time on stream.

The HDM and HDS conversions are presented in FIGS. 2 and 3 respectively. It is shown that both activities of this particular catalyst sustain over long period on the stream. In FIG. 4, the improvement of API gravity is plotted against time-on-steam (TOS). The metal-on-catalyst (MOC) is evaluated based on metals content in the crude and in the product and the values are presented in FIG. 5.

From Table 2 and FIGS. 2-5 the following can be noted:
a) The HDM activity of catalysts TS-5 and TS-6 is higher than those of the other catalysts for a particular feedstock which is in this case residue of a heavy crude oil.
b) The catalyst TS-6 contains only active metal whereas catalyst TS-5 contains active metals and appropriate amount of promoter.
c) Though catalyst TS-6 shows slightly lower activity compared with catalyst TS-5, it shows comparative higher stability with time-on-stream.
d) The catalyst prepared by chelating agent (TS-8) shows higher HDS activity, but it has moderate HDM activity.
e) The catalyst TS-6 which is used for long run stability test shows very good performance. Even with 2700 hours on stream this catalyst sustains its HDM and HDS activities. It is worth to mention that the hydrocarbon processed in this test contains very high percentage of metals (703.5 wppm), high sulfur (6.23 wt %) and very high asphaltene (21.83 wt %).
f) The percentage of metal-on-catalyst (MOC) on fresh catalyst on 2700 hours is around 182 which is very high. Therefore, the metal retention capacity of this catalyst is considerably high.

What is claimed is:

1. A catalyst for hydrotreating heavy crude oil and residue supported on an activated carbon extrudate having a wide pore structure and a total pore volume of 0.7 to 1.8 cc/g, the portion of pores having pore diameter in the range of 200 to 2000 Angstrom is 20 percent or more, and the ratio by volume of pores having pore diameter in the range of 380 to 900 Angstrom to pores having pore diameter in the range of 200 to 2000 Angstrom is 40 percent or more.

2. The catalyst of claim 1, wherein said carbon extrudate is activated by steam.

3. The catalyst of claim 1, wherein said support is impregnated with about 1 to 25% by weight of a transition metal hydrogenating component, about 0.5 to 10% by weight of a non-noble metal of the Group VIII, and 0.1 and 10% by weight of a non-metal of the Group VA.

4. The catalyst of claim 3, wherein said support is impregnated with about 6 to 15% by weight of a Group VIB transition metal hydrogenating component, about 1 and 6% by weight of a non-noble metal of the Group VIII, and 0.1 and 4% by weight of a non-metal of the Group VA.

5. The catalyst of claim 3, wherein the active elements are Mo, Ni or Co and P.

6. The catalyst of claim 3, wherein said catalyst additionally contains a chelating agent selected from the group consisting of 1,2-cyclohexanediamine-N,N,N',N'-tetraacetic acid (CyDTA), ethylenediaminetetraacetic acid (EDTA), diammonium ethylenediaminetetraacetic acid, hydroxyl ethylenediaminetetraacetic acid, diethyletriaminepentaacetic acid, ethyleneglycol-bis-N,N'-tetraacetic acid, cyclohexanediaminetetraacetic acid, and tetraethylenepetaamine.

7. The catalyst of claim 3, additionally containing $Fe_2O_3$ between 1 and 5 weight %.

8. A process for the hydrodemetallization and hydrodesulfurization of heavy crudes and residues using the catalyst of claim 1 under hydrotreatment conditions including a temperature of 100 to 500° C., a pressure of from atmospheric pressure to 350 kg/cm², and a space velocity (LHSV) in the range of 0.05 to 15 h⁻¹, with a rate of hydrogen from 90 to 2000 m³/m³.

9. The process of claim 8, wherein said hydrotreatment conditions include a temperature of 200 to 500° C., a pressure of 35 to 280 kg/cm², and a space velocity (LHSV) in the range of 0.1 to 10 h⁻¹, with a rate of hydrogen from 180 to 1200 m³/m³.

10. The process of claim 9, wherein said hydrotreatment conditions include a temperature of 350 to 450° C., a pressure of 40 to 210 kg/cm², and a space velocity (LHSV) in the range of 0.1 to 2 h⁻¹.

11. The catalyst of claim 1, wherein the catalyst sustains its hydrodemetallization and hydrodesulfurization activities for a period of at least 2700 hours.

12. The catalyst of claim 1, wherein the catalyst has very high metal retention capacity.

* * * * *